(12) United States Patent
Richter

(10) Patent No.: US 11,113,321 B2
(45) Date of Patent: Sep. 7, 2021

(54) METHOD AND DEVICE FOR MANAGING MAP DATA OF A DIGITAL MAP FOR A NAVIGATION APPARATUS

(71) Applicant: Bayerische Motoren Werke Aktiengesellschaft, Munich (DE)

(72) Inventor: Werner Richter, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 736 days.

(21) Appl. No.: 14/793,982

(22) Filed: Jul. 8, 2015

(65) Prior Publication Data

US 2015/0310038 A1 Oct. 29, 2015

Related U.S. Application Data

(63) Continuation of application No. PCT/EP2013/077026, filed on Dec. 18, 2013.

(30) Foreign Application Priority Data

Jan. 9, 2013 (DE) .................... 10 2013 200 181.9

(51) Int. Cl.
*G06F 16/00* (2019.01)
*G06F 16/29* (2019.01)
(Continued)

(52) U.S. Cl.
CPC ............. *G06F 16/29* (2019.01); *G01C 21/26* (2013.01); *G01C 21/32* (2013.01); *G06F 16/2365* (2019.01)

(58) Field of Classification Search
CPC ...... G06F 16/2365; G06F 16/29; G01C 21/32
See application file for complete search history.

(56) References Cited

U.S. PATENT DOCUMENTS 6,075,467 A * 6/2000 Ninagawa ............... G01C 21/32
340/990
6,546,334 B1 4/2003 Fukuchi et al.
(Continued)

FOREIGN PATENT DOCUMENTS

DE 198 37 618 A1 3/1999
DE 10 2005 029 744 A1 12/2006
(Continued)

OTHER PUBLICATIONS

German Search Report dated Aug. 1, 2013 with partial English-language translation (ten (10) pages).
(Continued)

*Primary Examiner* — Cheryl Lewis
(74) *Attorney, Agent, or Firm* — Crowell & Moring LLP

(57) ABSTRACT

In a method and a corresponding device for managing map data of a digital map for a navigation apparatus, the map data include original map data, wherein the original map data are each associated with one or more original map tiles. A validity indicator is assigned to each of the original map tiles. In the event of an update of an update map tile, associated update map data are assigned and permanently stored, wherein the particular update map tile is provided in order to replace the associated original map tile. After the update map data of the particular update map tile have been successfully stored, the validity indicator of the associated original map tile is set to invalid. During operation of the navigation apparatus, the particular original map tile is loaded if the validity indicator assigned thereto is valid, and otherwise the update map tile associated with the particular original map tile is loaded.

13 Claims, 1 Drawing Sheet

(51) Int. Cl.
*G06F 16/23* (2019.01)
*G01C 21/32* (2006.01)
*G01C 21/26* (2006.01)

(56) References Cited

U.S. PATENT DOCUMENTS

| | | | | |
|---|---|---|---|---|
| 8,825,937 | B2* | 9/2014 | Atkisson | G06F 12/0246 |
| | | | | 711/102 |
| 2005/0216193 | A1* | 9/2005 | Dorfman | G09B 29/106 |
| | | | | 701/400 |
| 2007/0109303 | A1* | 5/2007 | Muramatsu | G01C 21/32 |
| | | | | 345/440 |
| 2012/0209818 | A1* | 8/2012 | Richter | G06F 17/30241 |
| | | | | 707/690 |

FOREIGN PATENT DOCUMENTS

| | | |
|---|---|---|
| DE | 10 2007 032 998 A1 | 1/2009 |
| EP | 2543963 A1 | 1/2013 |

OTHER PUBLICATIONS

International Search Report (PCT/ISA/210) dated Apr. 10, 2014 with English-language translation (four (4) pages).

\* cited by examiner

METHOD AND DEVICE FOR MANAGING MAP DATA OF A DIGITAL MAP FOR A NAVIGATION APPARATUS

CROSS REFERENCE TO RELATED APPLICATIONS

This application is a continuation of PCT International Application No. PCT/EP2013/077026, filed Dec. 18, 2013, which claims priority under 35 U.S.C. § 119 from German Patent Application No. 10 2013 200 181.9, filed Jan. 9, 2013, the entire disclosures of which are herein expressly incorporated by reference.

BACKGROUND AND SUMMARY OF THE INVENTION

The invention relates to a method and to a device, respectively, for managing map data of a digital map of a navigation apparatus.

Many vehicles have a permanently installed navigation apparatus. If an error occurs during an updating of map data of this navigation apparatus, it is frequently necessary that the vehicle has to visit a workshop since the map data are damaged.

The object on which the invention is based is, on the one hand, to provide a method and, on the other hand, a corresponding device, for managing map data of a digital map of a navigation apparatus which contributes to ensuring high availability during operation of the navigation apparatus.

This and other objects are achieved in accordance with embodiments of the invention.

The invention is characterized, on the one hand, by a method and, on the other hand, by a corresponding device for managing map data of a digital map of a navigation apparatus. The map data have original map data which are stored in a memory which is allocated to the navigation apparatus. The original map data are in each case allocated to one of a number of original map tiles. A validity indicator is in each case allocated to the original map tiles. In the case of an update, associated update map data are allocated to an update map tile and stored permanently. The respective update map tile is provided for replacing an associated original map tile. After successful storage of the update map data of the respective update map tile, especially timed near the successful storage of the update map data of the respective update map tile, the validity indicator of the associated original map tile is set to invalid. During operation of the navigation apparatus, the respective original map tile is loaded if its associated validity indicator is valid. Otherwise the update map tile allocated to the respective original map tile is loaded.

By changing only the validity indicator of the original map data during an update, the original map data remain untouched apart from the validity indicator. In the case of a detected error, the validity indicator of the original map tile which is associated with the faulty update map tile can thus be reset to valid. In the case of a faulty update process such as, for example, by transmission of inconsistent or faulty data, it is thus possible to access the original map data and thus to continue to provide consistent data for the digital map of the navigation apparatus. Thus, the original map data are always available to the navigation apparatus even after faulty updating.

When the validity indicators are generated, they are first set to valid for all original map tiles. Thus, the original map tiles are loaded during operation of the navigation apparatus when there are no updates as yet.

For an application to find respective update map data, it may be advantageous if the storage path of the update map data is deposited, for example, in the application or globally in a file such as, for example, an initialization file.

If a fault of the respective update map tile and/or the update map data of the respective update map tile is detected, that is to say if it should be detected, for example, that the update comprises inconsistent data, the validity indicator of the respective original map tile which is allocated to the respective update map tile can be set to valid again, for example, if it has already been set to invalid so that, instead of the inconsistent data, the respective consistent original map data are loaded again.

According to an advantageous embodiment, the validity indicator in each case additionally has a date. The date of the associated validity indicator is adapted timed near the successful storage of the update maps of the respective update map tiles.

By this means, the date of the updating can be stored additionally in the validity indicator during an update.

According to a further advantageous embodiment, the respective validity indicator is stored in the header of the respective original map tiles. The validity indicator can be integrated in a simple manner by this measure.

According to a further advantageous embodiment, the original map data are protected by use of a signature and the respective validity indicators are stored outside the signature.

In this way, the validity indicator does not influence a protection function of the original map data such as, for example, the signature. The validity indicator can thus be used also in the case of original map data protected with the signature.

According to a further advantageous embodiment, after successful storage of the update map data of the respective update map tile, the storage path of the update map data of the respective update map tile is stored in the associated validity indicator. By this measure, it is possible to indicate to an application in a simple manner where the update map data of the respective update map tile can be found. Alternatively or additionally, the storage path can also be deposited globally.

Other objects, advantages and novel features of the present invention will become apparent from the following detailed description of one or more preferred embodiments when considered in conjunction with the accompanying drawings.

DETAILED DESCRIPTION OF THE DRAWINGS

Elements of identical construction or function are identified by the same reference symbols in all figures.

Figure 1:
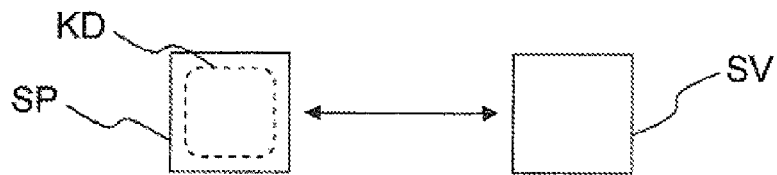
FIG. 1 is a schematic block diagram showing a control device and a memory with map data.

FIG. 1 shows a memory SP. The memory SP can have one storage unit or two or more storage units. In the memory SP, map data KD of a digital map of a navigation apparatus are stored. The map data KD can be stored in one storage unit and/or distributed over a number of storage units of the memory SP.

FIG. 1 also shows a control device SV. The control device SV has a computing unit, a data and program memory and an interface. By means of the interface, the control device SV can read data from the memory SP and/or write data into the memory SP.

The control device SV can also be called a device for managing map data of a digital map of a navigation apparatus.

Figure 2:
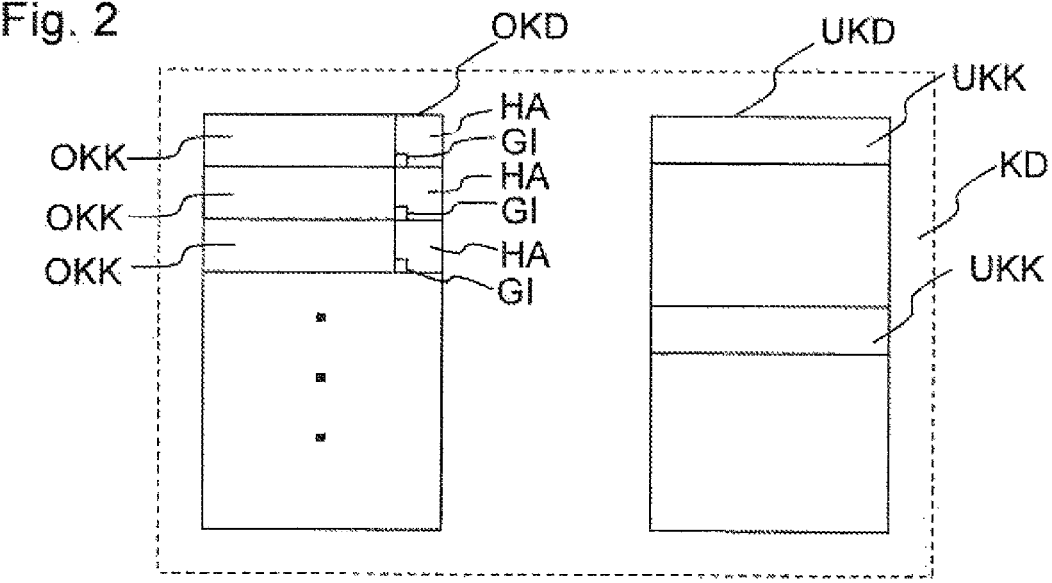
FIG. 2 is a schematic diagram of a structure of the map data of a digital map of a navigation apparatus.

FIG. 2 shows the structure of the map data KD of a digital map of a navigation apparatus. The map data KD have original map data OKD. The original map data OKD are in each case allocated to one of a number of original map tiles OKK. The respective original map tile OKK has header data HA, which are also called header. In the header HA of the respective original map tile OKK, a respective validity indicator GI is stored. The respective validity indicator GI is initially set to valid. It is used for identifying for an application whether the respective original map tile OKK is valid, that is to say is to be loaded, or not. In the case of an invalid validity indicator GI, an update map tile UKK which is allocated to the respective original map tile OKK is loaded instead of the original map tile OKK.

After an update, the map data KD also have update map data UKD. The update map data UKD are in each case allocated to an update map tile UKK, the respective update map tile UKK being provided for replacing an allocated original map tile OKK.

Thus, the digital map can always be assembled from the original map tiles OKK and/or the update map tiles UKK.

Figure 3:
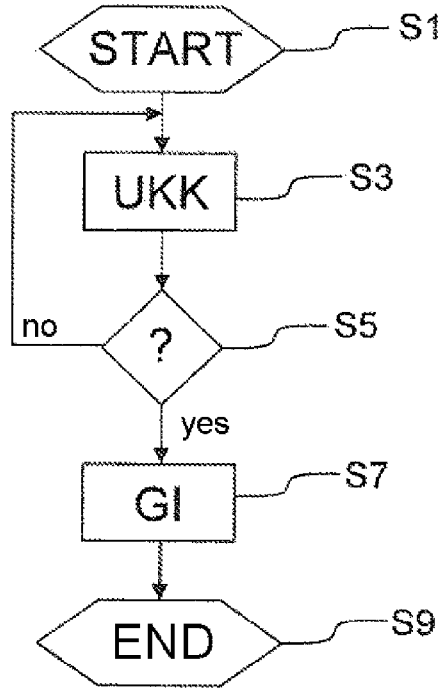
FIG. 3 is a flowchart for updating the digital map.

To carry out an update, a program which can be processed during the updating process is stored preferably in the data and program memory of the control device SV. The program is explained in greater detail in the text which follows by way of the flowchart of FIG. 3.

The program which is processed in the control device SV is started in a step S1, in which variables can be initialized if necessary.

In a step S3, update map data UKD associated with an update map tile UKK are allocated and stored permanently.

In a step S5, it is checked whether the update map data UKD of the respective update map tile UKK have been stored successfully. This can be determined, for example, by use of check sums. If this is not so, the processing is continued in step S3. If it is, the processing is continued in a step S7.

In step S7, the validity indicator GI of the original map tile OKK allocated to the update map tile UKK is set to invalid. Additionally, a date can be stored in the validity indicator GI, for example, such as, for example, the date of the updating process.

In a step S9, the program is ended and can be started again, if necessary, in step S1.

The storage path of the update map data UKD of the respective update map tile UKK is stored, for example, in the validity indicator GI. Alternatively or additionally, the storage path can also be stored globally such as, for example, in an initialization file.

In this way, the respective validity indicator GI is not set to valid, for example in the case of a faulty update. During the operation of the navigation apparatus, the respective original map data OKD are loaded, for example, instead of the faulty data in this case, in order to generate the digital map. Thus, the navigation apparatus is enabled to operate in spite of faulty updating in this case.

If the respective update map data UKD of the update map tile UKK have, for example, inconsistent data, the validity indicator GI of the associated original map tile OKK can be set to valid again, for example. Thus, the operation of the navigation apparatus is also enabled in this case in that the associated consistent original map data OKD are loaded instead of the inconsistent update map data UKD.

If the original map data OKD are protected by use of a signature, it is possibly advantageous if the validity indicators GI are stored outside the signature. In this way, a change in the validity indicators GI will not affect the signature of the original map data OKD.

| List of reference designations | |
|---|---|
| GI | validity indicator |
| HA | header |
| KD | map data |
| SP | memory |
| SV | control device |
| OKD | original map data |
| OKK | original map tile |
| UKD | update map data |
| UKK | update map tile |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for managing map data of a tiled digital map of a navigation apparatus configured to display the tiled digital map based on the map data loaded from a memory, the method comprising the acts of:
    storing original map data in the memory, the original map data including original map tiles, each original map tile representing a geographic region of the tiled digital map, each original map tile having a validity indicator settable to one of two states that respectively identify the original map tile as either valid, indicating original map tile loading, or invalid, indicating updated map tile loading in lieu of the original map tile loading;
    updating the tiled digital map without deleting or changing the original map tiles, wherein the updating includes:
        storing updated map data in the memory, the updated map data including updated map tiles associated with respective original map tiles;
        after successfully storing the updated map data, setting to invalid the respective validity indicator of each original map tile for which a respective updated map tile was stored, and continuing to store the original map tiles and the updated map tiles in the memory during subsequent updating; and
    loading, from the memory and for display by the navigation apparatus, the tiled digital map according to the following constraints: load respective original map tiles whose validity indicators are set to valid, and otherwise load respective updated map tiles.

2. The method according to claim 1, wherein each validity indicator comprises a date, said date being indicative of a time near the successful storage of the update map data of the respective update map tile.

3. The method according to claim 2, wherein each validity indicator is stored in a header of the original map tile.

4. The method according to claim 3, further comprising the act of:
after successfully storing the updated map data, storing storage paths of the updated map data map data in respective validity indicators of the original map tiles associated with the respective updated map tiles.

5. The method according to claim 2, further comprising the act of:
after successfully storing the updated map data, storing storage paths of the updated map data map data in respective validity indicators of the original map tiles associated with the respective updated map tiles.

6. The method according to claim 1, wherein each validity indicator is stored in a header of the original map tile.

7. The method according to claim 1, further comprising the act of:
protecting the original map data via a signature, wherein respective validity indicators are stored outside the signature.

8. The method according to claim 1, further comprising the act of:
after successfully storing the updated map data, storing storage paths of the updated map data map data in respective validity indicators of the original map tiles associated with the respective updated map tiles.

9. A device for managing map data of a tiled digital map of a navigation apparatus configured to display the tiled digital map based on the map data loaded from a memory, the device comprising:
a non-transitory computer readable medium having instructions stored therein, which when executed carry out the method of:
storing original map data in the memory, the original map data including original map tiles, each original map tile representing a geographic region of the tiled digital map, each original map tile having a validity indicator settable to one of two states that respectively identify the original map tile as either valid, indicating original map tile loading, or invalid, indicating updated map tile loading in lieu of the original map tile loading;
updating the tiled digital map without deleting or changing the original map tiles, wherein the updating includes:
storing updated map data in the memory, the updated map data including updated map tiles associated with respective original map tiles;
after successfully storing the updated map data, setting to invalid the respective validity indicator of each original map tile for which a respective updated map tile was stored, and continuing to store the original map tiles and the updated map tiles in the memory during subsequent updating; and
loading, from the memory and for display by the navigation apparatus, the tiled digital map according to the following constraints: load respective original map tiles whose validity indicators are set to valid, and otherwise load respective updated map tiles.

10. The device according to claim 9, wherein each validity indicator comprises a date, said date being indicative of a time near the successful storage of the update map data of the respective update map tile.

11. The device according to claim 9, wherein each validity indicator is stored in a header of the original map tile.

12. The device according to claim 9, further comprising the act of:
protecting the original map data via a signature, wherein respective validity indicators are stored outside the signature.

13. The device according to claim 9, further comprising the act of:
after successfully storing the updated map data, storing storage paths of the updated map data map data in respective validity indicators of the original map tiles associated with the respective updated map tiles.

* * * * *